(12) United States Patent
Han et al.

(10) Patent No.: US 12,216,875 B2
(45) Date of Patent: Feb. 4, 2025

(54) DISPLAY APPARATUS

(71) Applicant: LG Display Co., Ltd., Seoul (KR)

(72) Inventors: Bum Hee Han, Paju-si (KR); Jong Moo Ha, Paju-si (KR); Ji Won Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/532,884

(22) Filed: Dec. 7, 2023

(65) Prior Publication Data

US 2024/0103675 A1 Mar. 28, 2024

Related U.S. Application Data

(62) Division of application No. 17/990,660, filed on Nov. 19, 2022, now Pat. No. 11,875,008.

(30) Foreign Application Priority Data

Dec. 28, 2021 (KR) .......................... 10-2021-0190427

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/04164* (2019.05); *G06F 3/0446* (2019.05); *G06F 2203/04112* (2013.01)

(58) Field of Classification Search
CPC .. G06F 2203/04111; G06F 2203/04112; G06F 3/0412; G06F 3/04164; G06F 3/0443; G06F 3/0446; G06F 3/0448
See application file for complete search history.

(56) References Cited

U.S. PATENT DOCUMENTS

| 9,081,447 | B2 | 7/2015 | Ishizaki et al. |
| 9,606,661 | B2 | 3/2017 | Ishizaki et al. |
| 10,061,418 | B2 | 8/2018 | Ishizaki et al. |
| 10,365,745 | B2 | 7/2019 | Ishizaki et al. |
| 2012/0044203 | A1 | 2/2012 | Ishizaki et al. |

(Continued)

FOREIGN PATENT DOCUMENTS

| KR | 10-1811060 B1 | 12/2017 |
| KR | 10-2021-0079816 A | 6/2021 |

*Primary Examiner* — Robin J Mishler
(74) *Attorney, Agent, or Firm* — Fenwick & West LLP

(57) ABSTRACT

Disclosed is a display apparatus including emissive devices disposed in a display area, signal lines disposed in a non-display area, first touch electrodes disposed in the display area, the first touch electrodes being arranged in a first direction, second touch electrodes disposed in the display area while being arranged in a second direction perpendicular to the first direction, touch routing lines disposed in the non-display area, the touch routing lines being electrically connected to the first touch electrodes or the second touch electrodes, wherein the display area includes a first region including touch blocks surrounded by lines dividing the first touch electrodes into halves in the second direction and lines dividing the second touch electrodes into halves in the first direction and a second region provided so as to surround the first region, the touch blocks being disposed spaced apart from each other in the second region.

19 Claims, 13 Drawing Sheets

(56) References Cited

U.S. PATENT DOCUMENTS

| | | | |
|---|---|---|---|
| 2014/0118298 A1* | 5/2014 | Han | .................. G06F 3/0443 345/174 |
| 2015/0268781 A1 | 9/2015 | Ishizaki et al. | |
| 2017/0147120 A1 | 5/2017 | Ishizaki et al. | |
| 2018/0356929 A1 | 12/2018 | Ishizaki et al. | |
| 2020/0167037 A1* | 5/2020 | Lee | .................. G06F 3/0446 |
| 2021/0193754 A1 | 6/2021 | Han et al. | |
| 2022/0317795 A1 | 10/2022 | Tong et al. | |

* cited by examiner

DISPLAY APPARATUS

CROSS-REFERENCE TO RELATED APPLICATIONS

This application is a divisional application of U.S. patent application Ser. No. 17/990,660 filed on Nov. 19, 2022, which claims the benefit of Korean Patent Application No. 10-2021-0190427, filed on Dec. 28, 2021, all of which are hereby incorporated by reference as if fully set forth herein.

BACKGROUND OF THE INVENTION

Technical Field

The present disclosure relates to a display apparatus.

Discussion of the Related Art

With growth of information society, demand for a display apparatus that displays an image has increased. Various display apparatuses, such as a liquid crystal display apparatus and an organic light-emitting display apparatus, are used.

In order to provide a variety of functions to users, the display apparatus provides a function of recognizing user touch on a display panel and performing an input process based on the recognized touch.

As an example, a display apparatus capable of recognizing touch includes a plurality of touch electrodes disposed or mounted in a display panel, wherein the touch electrodes are driven to detect whether a user has touched the display panel and touch coordinates.

In recent years, demand for high performance in a touch function of the display panel has greatly increased, and design for improving efficiency of the touch electrodes has been adopted. In order to satisfy demand for such design, the same-shaped touch electrodes may be disposed at the same intervals in the display panel such that touch having the same touch characteristics (or functions) can be detected. As a result, touch performance of a touch area located at a contour part of a display area of the display panel is not uniform.

SUMMARY OF THE INVENTION

Accordingly, the present disclosure is directed to a display apparatus that substantially obviates one or more problems due to limitations and disadvantages of the related art.

An aspect of the present disclosure is directed to a disposition structure of touch electrodes configured such that touch sensing performance of a touch area located at a contour part of a display area of a display panel is identical to touch sensing performance of a touch area located at a non-contour part of the display area.

Additional features and aspects of the disclosure will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these other aspects of the inventive concept, as embodied and broadly described herein, a display apparatus comprises a plurality of emissive devices disposed in a display area, a plurality of signal lines disposed in a non-display area located outside the display area, a plurality of first touch electrodes disposed in the display area, the plurality of first touch electrodes being arranged in a first direction (or X-direction), and a plurality of second touch electrodes disposed in the display area, the plurality of second touch electrodes being arranged in a second direction (or Y-direction) perpendicular to the first direction, a plurality of touch routing lines disposed in the non-display area, the plurality of touch routing lines being electrically connected to the first touch electrodes or the second touch electrodes, wherein the display area includes a first region including touch blocks surrounded by lines that divide the plurality of first touch electrodes into halves in the second direction and lines that divide the plurality of second touch electrodes into halves in the first direction and a second region provided so as to surround the first region, the touch blocks being disposed spaced apart from each other in the second region.

In another aspect, a display apparatus includes a plurality of emissive devices disposed in a display area, a plurality of signal lines disposed in a non-display area located outside the display area, an encapsulation portion disposed on the plurality of emissive devices and the plurality of signal lines, a plurality of first touch electrodes disposed on the encapsulation portion in the display area, the plurality of first touch electrodes being arranged in a first direction, and a plurality of second touch electrodes disposed on the encapsulation portion in the display area, the plurality of second touch electrodes being arranged in a second direction perpendicular to the first direction, one or more third touch electrodes including first extension portions having lines that divide the first touch electrodes into halves in the second direction extending in the first direction, one or more fourth touch electrodes including second extension portions having lines that divide the second touch electrodes into halves in the first direction extending in the second direction, and a plurality of touch routing lines disposed on the encapsulation portion in the non-display area, the plurality of touch routing lines being electrically connected to the first to fourth touch electrodes, wherein the display area includes a first region in which the plurality of first touch electrodes and the plurality of second touch electrodes are disposed and a second region provided so as to surround the first region, the one or more third touch electrodes or the one or more fourth touch electrodes being disposed in the second region.

In still another aspect, a touch panel includes a plurality of touch electrodes arranged in a first direction or a second direction, the touch electrodes arranged in one or more touch blocks, the touch panel comprising: a plurality of first touch blocks of a first shape; a plurality of second touch blocks of a second shape different from the first shape, the second touch blocks disposed in outermost regions of the touch panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

Figure 1:
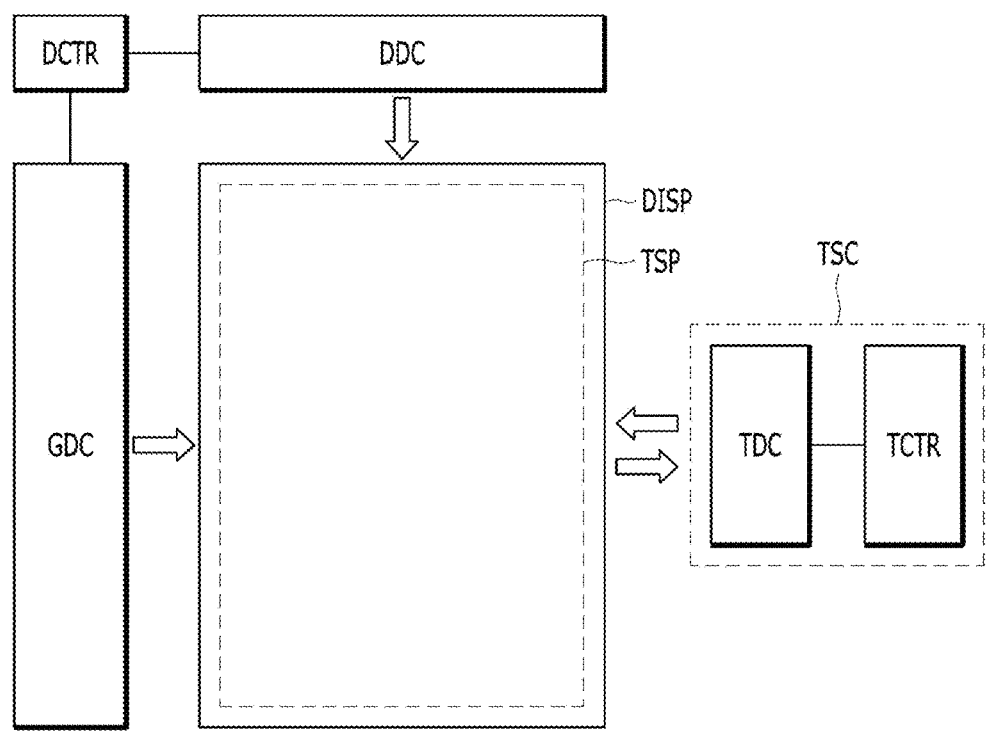
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

The shapes, sizes, ratios, angles, numbers, and the like disclosed in the drawings for describing embodiments of the present disclosure are merely examples, and thus, the present disclosure is not limited to the illustrated details. Like reference numerals refer to like elements throughout. IN the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to accompanying drawings. For convenience of description, a scale of each of elements illustrated in the accompanying drawings differs from a real scale, and thus, is not limited to a scale illustrated in the drawings.

Hereinafter, various constructions of a display apparatus configured such that an extension portion of a touch electrode is disposed between the same-shaped touch blocks, whereby it is possible to secure touch performance equivalent to touch performance between the same-shaped touch blocks, design standardization through design simplicity is possible, and inspection of repeatability of the touch blocks is easily performed will be described in detail.

FIG. 1 illustrates the construction of a display apparatus according to an embodiment of the present disclosure.

With reference to FIG. 1, the display apparatus according to the embodiment of the present disclosure may provide both an image display function and a touch sensing function.

In order to provide the image display function, the display apparatus according to the embodiment of the present disclosure may include a display panel DISP, in which a plurality of data lines and a plurality of gate lines are disposed and in which a plurality of subpixels defined by the plurality of data lines and the plurality of gate lines are arranged, a data driving circuit DDC configured to drive the plurality of data lines, a gate driving circuit GDC configured to drive the plurality of gate lines, and a display controller DCTR configured to control the operation of the data driving circuit DDC and the gate driving circuit GDC.

Each of the data driving circuit DDC, the gate driving circuit GDC, and the display controller DCTR may be implemented by one or more individual parts. Depending on circumstances, two or more of the data driving circuit DDC, the gate driving circuit GDC, and the display controller DCTR may be integrated into one part. For example, the data driving circuit DDC and the display controller DCTR may be implemented by one integrated circuit (IC) chip.

In order to provide the touch sensing function, the display apparatus according to the embodiment of the present disclosure may include a touch panel TSP including a plurality of touch electrodes and a touch sensing circuit TSC configured to supply a touch driving signal to the touch panel TSP, to detect a touch sensing signal from the touch panel TSP, and to sense whether a user has touched the touch panel TSP or a touch position (touch coordinates) based on the detected touch sensing signal.

For example, the touch sensing circuit TSC may include a touch driving circuit TDC configured to supply a touch driving signal to the touch panel TSP and to detect a touch sensing signal from the touch panel TSP and a touch controller TCTR configured to sense whether the user has touched the touch panel TSP and/or a touch position based on the touch sensing signal detected by the touch driving circuit TDC.

The touch driving circuit TDC may include a first circuit part configured to supply a touch driving signal to the touch panel TSP and a second circuit part configured to detect a touch sensing signal from the touch panel TSP.

The touch driving circuit TDC and the touch controller TCTR may be implemented by separate parts, or may be integrated into one part depending on circumstances.

Each of the data driving circuit DDC, the gate driving circuit GDC, and the touch driving circuit TDC may be implemented by one or more integrated circuits, may be implemented as a chip on glass (COG) type, chip on film (COF) type, or tape carrier package (TCP) type in terms of electrical connection with the display panel DISP. The gate driving circuit GDC may also be implemented as a gate in panel (GIP) type.

Meanwhile, each of the circuit configurations DDC, GDC, and DCTR for display driving and the circuit configurations TDC and TCTR for touch sensing may be implemented by one or more individual parts. Depending on circumstances, one or more of the circuit configurations DDC, GDC, and DCTR for display driving and one or more of the circuit configurations TDC and TCTR for touch sensing may be functionally integrated and implemented by one or more parts.

For example, the data driving circuit DDC and the touch driving circuit TDC may be integrated into one or more integrated circuit chips. When the data driving circuit DDC and the touch driving circuit TDC are integrated into two or more integrated circuit chips, each of the two or more integrated circuit chips may have a data driving function and a touch driving function.

The display apparatus according to the embodiment of the present disclosure may be an organic light-emitting display apparatus or a liquid crystal display apparatus. For example, the display panel DISP may be an organic light-emitting display panel or a liquid crystal display panel. Hereinafter, an organic light-emitting display panel will be described as the display panel DISP for convenience of description.

As will be described below, the touch panel TSP may include a plurality of touch electrodes, to which a touch driving signal is applied or from which a touch sensing signal is detected, and a plurality of touch routing lines configured to connect the plurality of touch electrodes to the touch driving circuit TDC.

The touch panel TSP may be disposed outside the display panel DISP. For example, the touch panel TSP and the display panel DISP may be separately manufactured and coupled or connected to each other. This touch panel TSP is called an external touch panel or an add-on type touch panel.

As another example, the touch panel TSP may be mounted in the display panel DISP. For example, when the display panel DISP is manufactured, a touch sensor structure constituting the touch panel TSP, i.e., the plurality of touch electrodes and the plurality of touch routing lines, may be formed together with the electrodes and the signal lines for display driving. This touch panel TSP is called an internal touch panel. Hereinafter, an internal touch panel will be described as the touch panel TSP for convenience of description.

Figure 2:
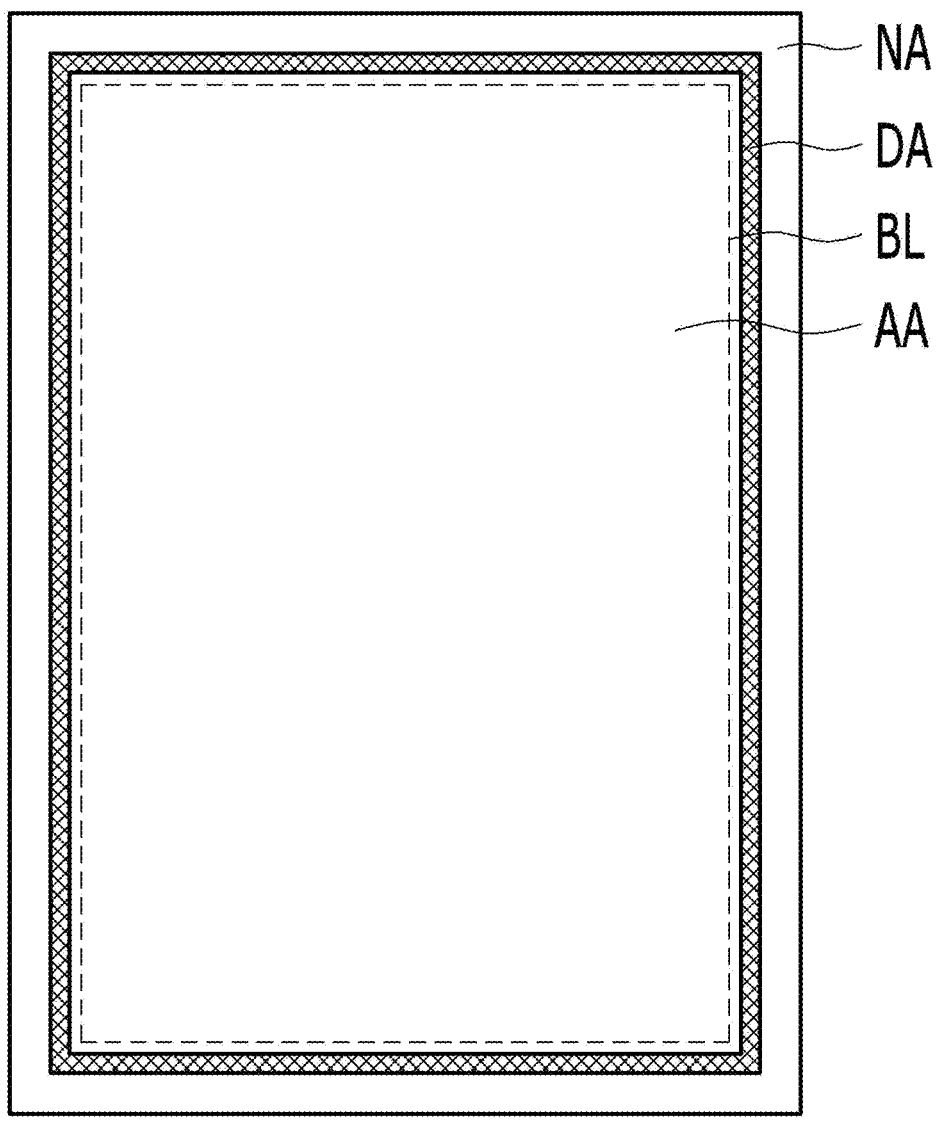
FIG. 2 illustrates a display panel of the display apparatus according to an embodiment of the present disclosure.

FIG. 2 illustrates the display panel of the display apparatus according to the embodiment of the present disclosure.

With reference to FIG. 2, the display panel DISP may include an active area AA, in which an image is displayed, and a non-active area NA, which is outside a contour border line BL of the active area AA. The active area AA may also be referred to as a display area or a screen part, and the non-active area NA may also be referred to as a non-display area or a bezel part. However, the present disclosure is not limited as to terms.

In the active area AA of the display panel DISP, a plurality of subpixels for image display are arranged, and various electrodes and signal lines for display driving are disposed.

In the active area AA of the display panel DISP, a plurality of touch electrodes for touch sensing and a plurality of touch routing lines electrically connected thereto may be disposed. Consequently, the active area AA may also be referred to as a touch sensing area in which touch sensing is possible.

In the non-active area NA of the display panel DISP, link lines to which various signal lines disposed in the active area AA extend or link lines electrically connected to the various signal lines disposed in the active area AA and pads electrically connected to the link lines may be disposed. The display driving circuits such as DDC and GDC may be bonded or electrically connected to the pads disposed in the non-active area NA.

Also, in the non-active area NA of the display panel DISP, link lines to which the plurality of touch routing lines disposed in the active area AA extends or link lines electrically connected to the plurality of touch routing lines disposed in the active area AA and pads electrically connected to the link lines may be disposed. The touch driving circuit TDC may be bonded or electrically connected to the pads disposed in the non-active area NA.

In the non-active area NA, extension portions of some of the outermost touch electrodes, among the plurality of touch electrodes disposed in the active area AA, may be present, and one or more electrodes (touch electrodes) made of the same material as the plurality of touch electrodes disposed in the active area AA may be further disposed.

For example, the plurality of touch electrodes disposed in the display panel DISP may all be present in the active area AA, some (e.g., the outermost touch electrodes) of the plurality of touch electrodes disposed in the display panel DISP may be disposed in the non-active area NA, or some (e.g., the outermost touch electrodes) of the plurality of touch electrodes disposed in the display panel DISP may be disposed over the active area AA and the non-active area NA.

Meanwhile, with reference to FIG. 2, the display panel of the display apparatus according to the embodiment of the present disclosure may include a dam area DA in which a dam configured to prevent collapse of a certain layer (e.g., an encapsulation portion in the organic light-emitting display panel) in the active area AA is disposed.

The dam area DA may be located at a border point between the active area AA and the non-active area NA or a certain point of the non-active area NA, which is outside the active area AA.

In the dam area DA, the dam may be disposed around the entirety of the active area AA or may be disposed only outside one or more portions (e.g., portions in which easily collapsible layers are present) of the active area AA.

The dam disposed in the dam area DA may be formed in a continuous pattern or two or more discontinuous patterns. Also, in the dam area DA, only a first dam may be disposed, two dams (e.g., a first dam and a second dam) may be disposed, or three or more dams may be disposed.

In the dam area DA, only the first dam may be disposed in one direction, and both the first dam and the second dam may be disposed in another direction.

Figure 3:
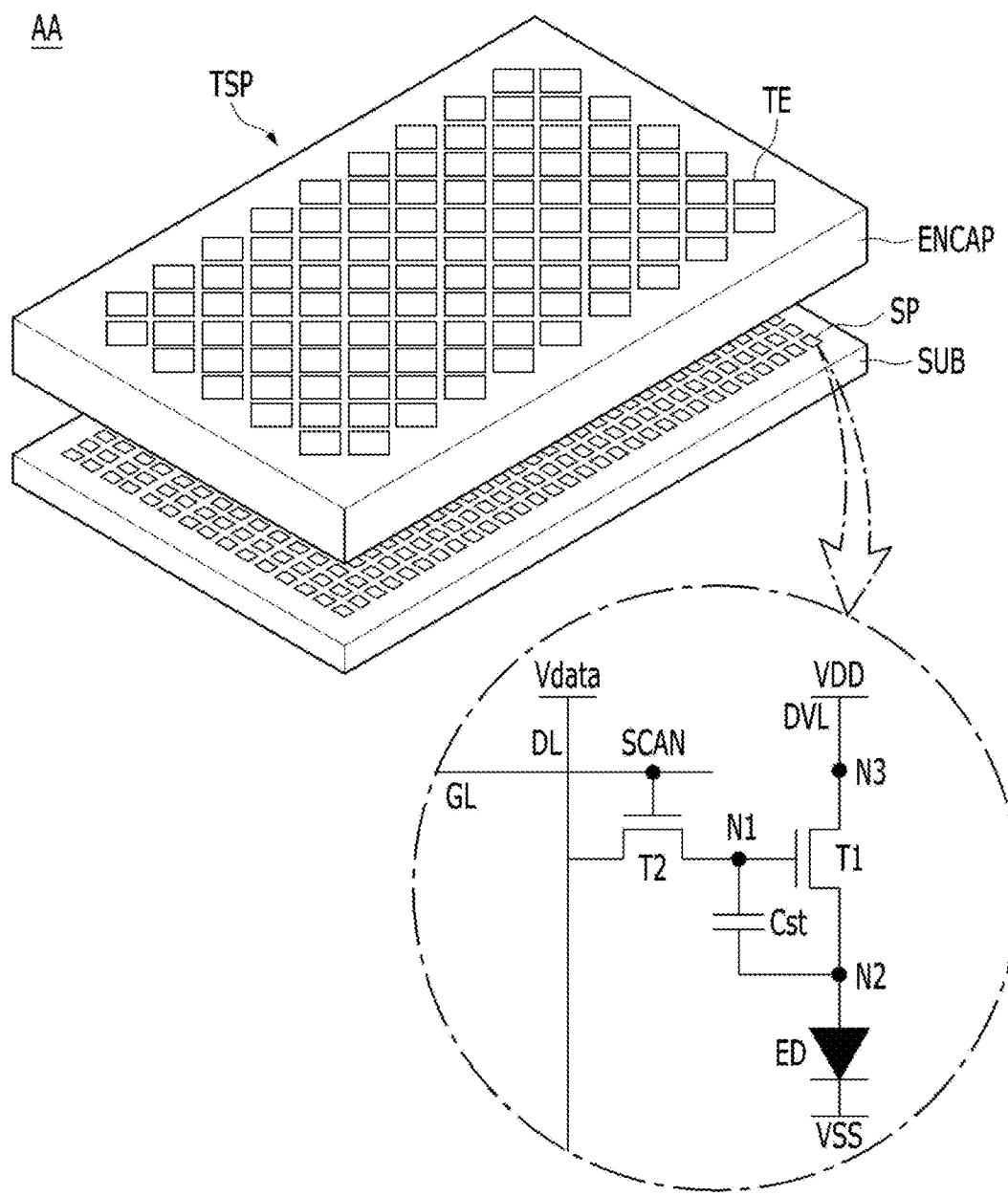
FIG. 3 illustrates a structure in which a touch panel is mounted in the display panel according to an embodiment of the present disclosure.

FIG. 3 illustrates a structure in which the touch panel is mounted in the display panel according to the embodiment of the present disclosure.

With reference to FIG. 3, a plurality of subpixels SP are arranged on a substrate SUB in the active area AA of the display panel DISP.

Each subpixel SP may include an emissive device ED, a first transistor T1 configured to drive the emissive device ED, a second transistor T2 configured to transmit data voltage VDATA to a first node N1 of the first transistor T1, and a storage capacitor Cst configured to maintain constant voltage during one frame.

The first transistor T1 may include a first node N1, to which data voltage VDATA is applied, a second node N2 electrically connected to the emissive device ED, and a third node N3, to which driving voltage VDD is applied from a driving voltage line DVL. The first node N1 may be a gate node, the second node N2 may be a source node or a drain node, and the third node N3 may be a drain node or a source node. However, the present disclosure is not limited as to terms. The first transistor T1 may be a driving transistor configured to drive the emissive device ED; however, the present disclosure is not limited as to terms.

The emissive device ED may include a first electrode (e.g., an anode), an emissive layer, and a second electrode (e.g., a cathode). The first electrode may be electrically connected to the second node N2 of the first transistor T1, and base voltage VSS may be applied to the second electrode.

In the emissive device ED, the emissive layer may be an organic emissive layer including an organic material. For example, the emissive device ED may be an organic light-emitting diode (OLED).

The second transistor T2 may be on-off controlled by a scan signal SCAN applied through a gate line GL, and may be electrically connected between the first node N1 of the first transistor T1 and a data line DL. The second transistor T2 may be a switching transistor; however, the present disclosure is not limited as to terms.

When turned on by the scan signal SCAN, the second transistor T2 transmits data voltage VDATA supplied from the data line DL to the first node N1 of the first transistor T1.

The storage capacitor Cst may be electrically connected between the first node N1 and the second node N2 of the first transistor T1.

As shown in FIG. 3, each subpixel SP may have a 2T1C structure including two transistors T1 and T2 and one capacitor Cst; however, the present disclosure is not limited thereto. For example, one or more transistors may be further included, or one or more capacitors may be further included.

The storage capacitor Cst may be an external capacitor additionally provided outside the first transistor T1 by design, not a parasitic capacitor Cgs or Cgd, which is an internal capacitor that may be present between the first node N1 and the second node N2 of the first transistor T1.

Each of the first transistor T1 and the second transistor T2 may be an n-type transistor or a p-type transistor.

Meanwhile, as described above, circuit devices, such as an emissive device ED, two or more transistors T1 and T2, and one or more capacitors Cst, are disposed in the display panel DISP. Since the circuit devices (e.g., the emissive device ED) have low resistance to external moisture or oxygen, an encapsulation portion ENCAP configured to prevent permeation of external moisture or oxygen into the circuit devices (e.g., the emissive device ED) may be disposed in the display panel DISP.

The encapsulation portion ENCAP may be constituted by one layer or a plurality of layers. However, the present disclosure is not limited thereto.

Meanwhile, in the display apparatus according to the embodiment of the present disclosure, the touch panel TSP may be formed on the encapsulation portion ENCAP.

For example, in the display apparatus, the touch sensor structure constituting the touch panel TSP, i.e., the plurality of touch electrodes TE, may be disposed on the encapsulation portion ENCAP.

At the time of touch sensing, a touch driving signal or a touch sensing signal may be applied to the touch electrode TE. At the time of touch sensing, therefore, potential difference is formed between the touch electrode TE and the cathode disposed in the state in which the encapsulation portion ENCAP is interposed therebetween, whereby unnecessary parasitic capacitance may be formed. Since the parasitic capacitance may lower touch sensitivity, the distance between the touch electrode TE and the cathode may be set to a predetermined value (e.g., 1 μm) or more in consideration of panel thickness, panel manufacturing process, and display performance in order to reduce parasitic capacitance. For example, the thickness of the encapsulation portion ENCAP may be set to a minimum of 1 μm.

Figure 4:
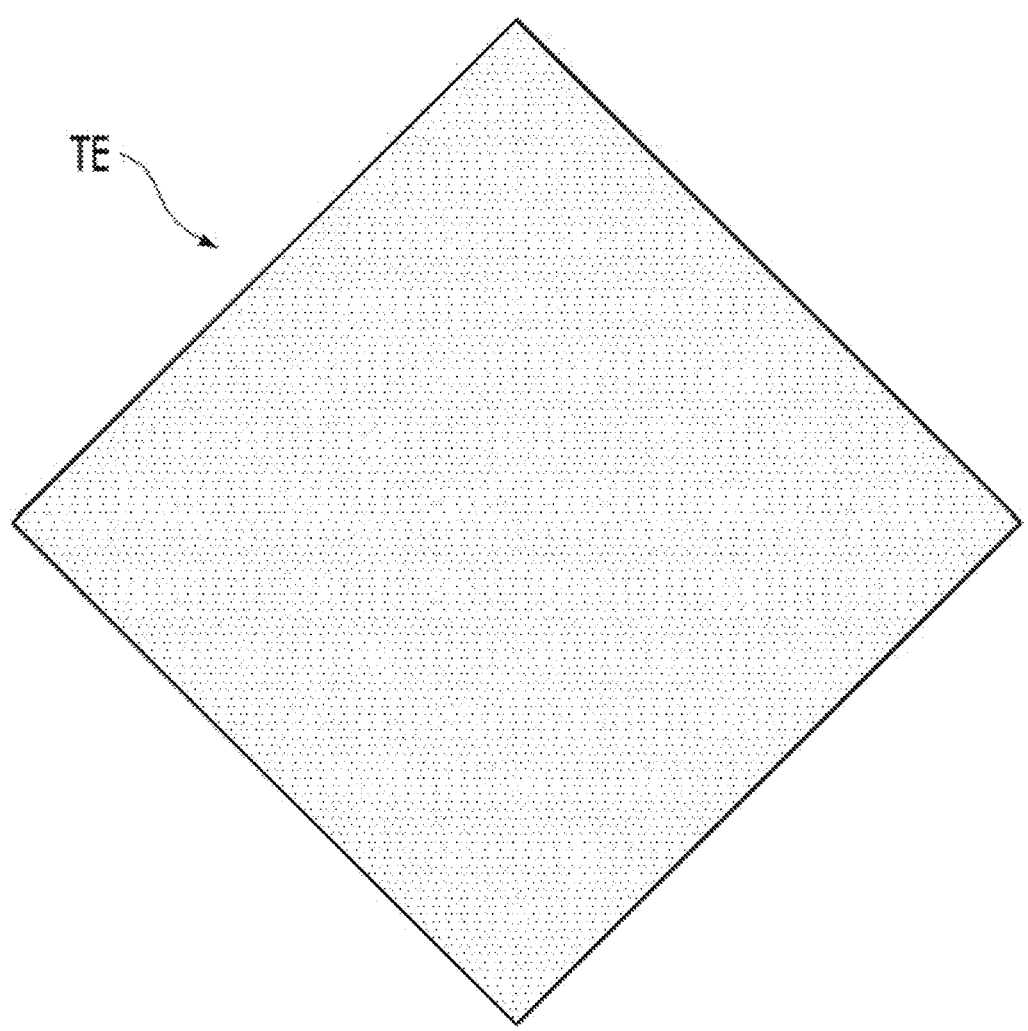
FIGS. 4 and 5 illustrate a touch electrode disposed in the display panel according to an embodiment of the present disclosure.
Figure 5:
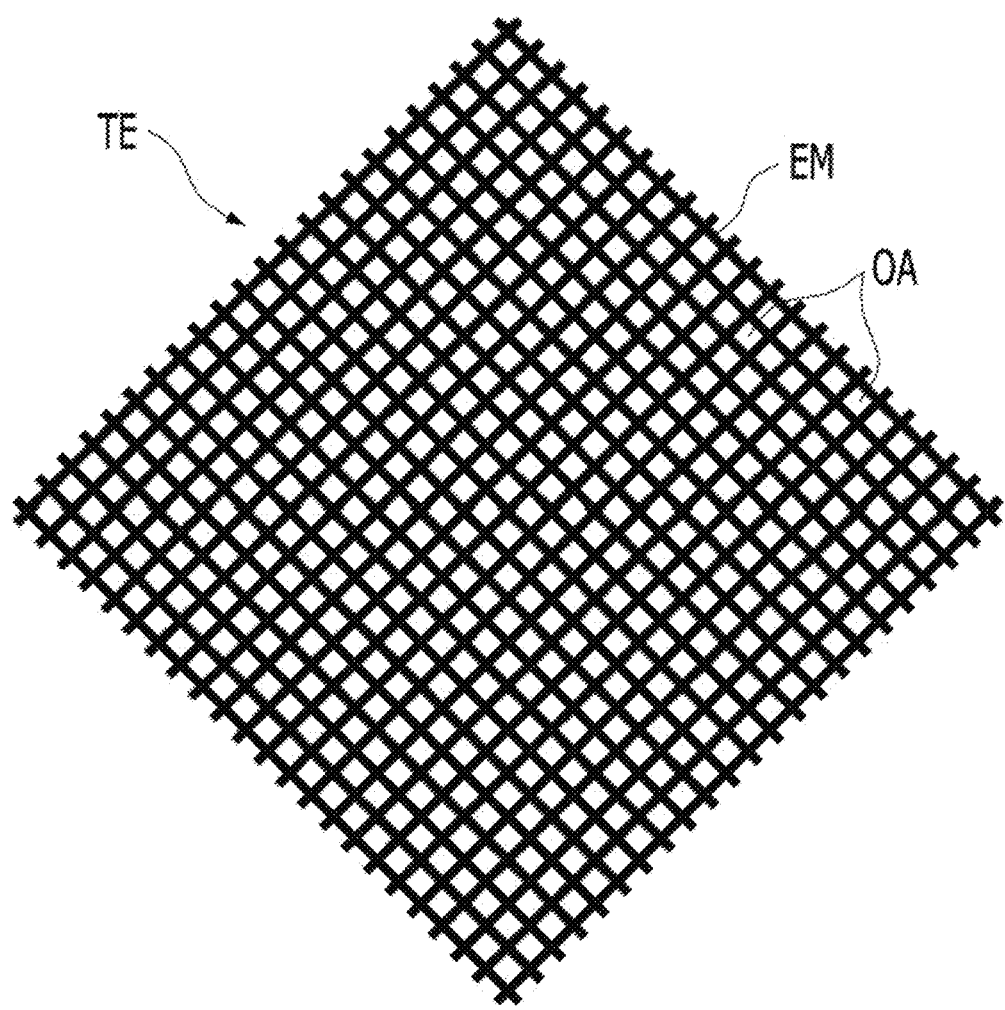

FIGS. 4 and 5 illustrate the touch electrode disposed in the display panel according to the embodiment of the present disclosure.

As shown in FIG. 4, each touch electrode TE disposed in the display panel DISP may be a plate-shaped electrode metal having no opening. In this case, each touch electrode TE may be a transparent electrode. For example, each touch electrode TE may be made of a transparent electrode material such that light emitted from the plurality of subpixels SP disposed thereunder is transmitted upwards therethrough.

In another embodiment, as shown in FIG. 5, each touch electrode TE disposed in the display panel DISP may be an electrode metal EM patterned into a mesh type so as to have two or more openings OA.

The electrode metal EM may be a substantial portion corresponding to the touch electrode TE. The electrode metal EM may be a portion to which a touch driving signal is applied or from which a touch sensing signal is sensed.

When each touch electrode TE is an electrode metal EM patterned into a mesh type, as shown in FIG. 5, two or more openings OA may be present in the touch electrode TE.

Each of the two or more openings OA present in each touch electrode TE may correspond to emissive regions of one or more subpixels SP. For example, the plurality of openings OA may be a path through which light emitted from the plurality of subpixels SP disposed thereunder passes upwards. Hereinafter, an example in which each touch electrode TE is a mesh type electrode metal EM will be described for convenience of description.

The electrode metal EM corresponding to each touch electrode TE may be located on a bank disposed in regions other than emissive regions of two or more subpixels SP.

Meanwhile, as a method of forming several touch electrodes TE, an electrode metal EM may be widely formed into a mesh type, and the electrode metal EM may be cut into a predetermined pattern so as to be electrically separated from each other, whereby several touch electrode TE may be formed.

The contour shape of the touch electrode TE may be a quadrangle, such as a diamond or a lozenge, as shown in FIGS. 4 and 5, or may be any of various shapes, such as a triangle, a pentagon, or a hexagon. However, the present disclosure is not limited thereto.

Figure 6:
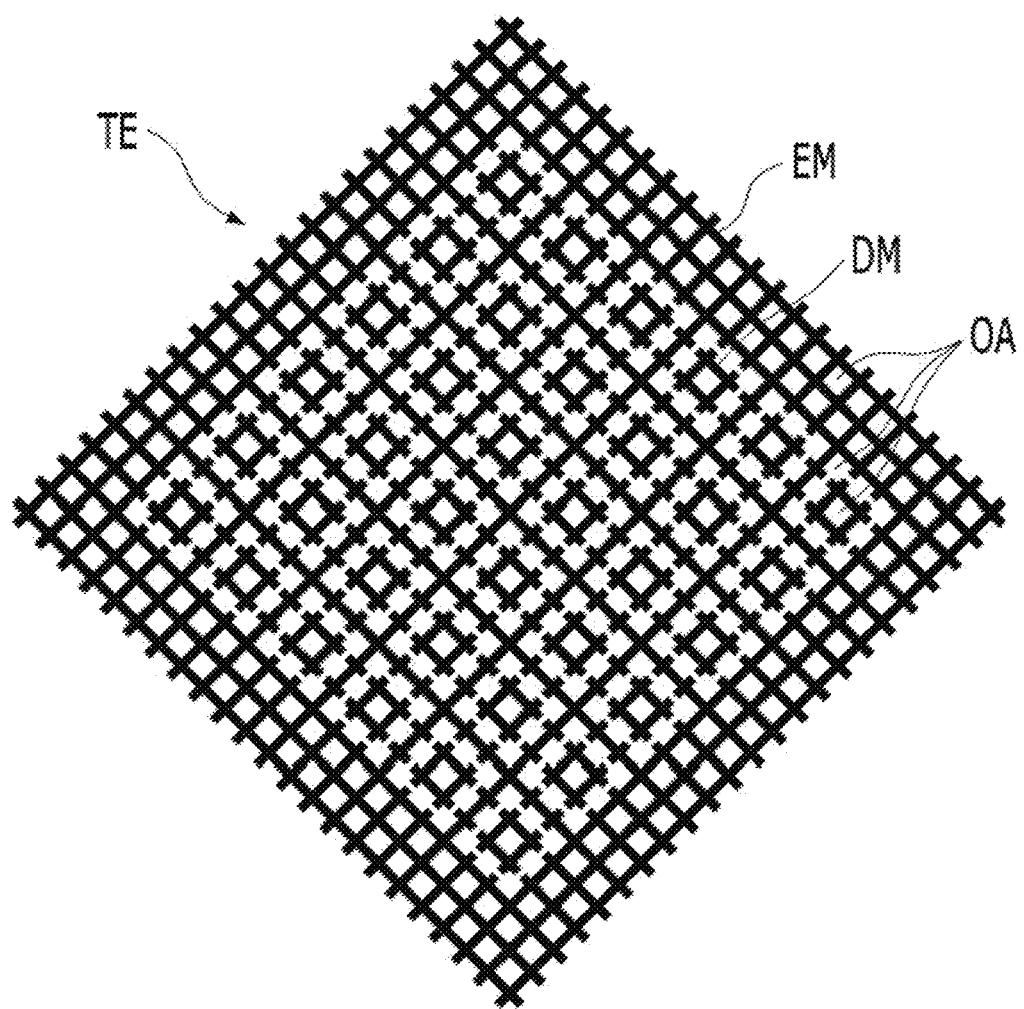
FIG. 6 illustrates a mesh type touch electrode of FIG. 5.

FIG. 6 illustrates the mesh type touch electrode of FIG. 5.

With reference to FIG. 6, at least one dummy metal DM disconnected from the mesh type electrode metal EM may be present in each touch electrode TE.

The electrode metal EM, which is a substantial portion corresponding to the touch electrode TE, may be a portion to which a touch driving signal is applied or from which a touch sensing signal is sensed. The dummy metal DM may be a portion to which no touch driving signal is applied or from which no touch sensing signal is sensed although dummy metal DM is present in the touch electrode TE. For example, the dummy metal DM may be an electrically floating metal. Consequently, the electrode metal EM may be electrically connected to the touch driving circuit TDC, whereas the dummy metal DM may not be electrically connected to the touch driving circuit TDC.

At least one dummy metal DM may be present in each of all touch electrodes TE in a state of being disconnected from the electrode metal EM.

In another embodiment, at least one dummy metal DM may be present only in each of some of all touch electrodes TE in a state of being disconnected from the electrode metal EM. For example, no dummy metal DM may be present in some touch electrodes TE.

Meanwhile, in connection with the function of the dummy metal DM, when no dummy metal DM is present and only the mesh type electrode metal EM is present in the touch electrode TE, as shown in FIG. 5, a visible issue in which the contour of the electrode metal EM appears on the screen may occur.

In contrast, when at least one dummy metal DM is present in the touch electrode TE, as shown in FIG. 6, a visible issue in which the contour of the electrode metal EM appears on the screen may be prevented.

In addition, presence or absence of dummy metals DM or the number of dummy metals DM (or the dummy metal percentage) may be adjusted for each touch electrode TE, whereby the magnitude of capacitance may be adjusted for each touch electrode TE, and therefore touch sensitivity may be improved.

Meanwhile, some points may be cut from the electrode metal EM formed in one touch electrode TE, whereby the cut electrode metals EM may be formed as dummy metals DM. For example, the electrode metal EM and the dummy metal DM may be made of the same material and formed on the same layer.

Meanwhile, the display apparatus according to the embodiment of the present disclosure may sense touch based on capacitance formed in the touch electrode TE.

The display apparatus according to the embodiment of the present disclosure may sense touch in a mutual-capacitance-based touch sensing mode, which is one kind of capacitance-based touch sensing mode, or may sense touch in a self-capacitance-based touch sensing mode, which is another kind of capacitance-based touch sensing mode.

In the mutual-capacitance-based touch sensing mode, the plurality of touch electrodes TE may be classified into a driving touch electrode (or transmittance touch electrode) to which a touch driving signal is applied and a sensing touch electrode (or reception touch electrode) from which a touch sensing signal is detected and which forms capacitance with the driving touch electrode.

In the mutual-capacitance-based touch sensing mode, the touch sensing circuit TSC senses whether touch has been performed and/or touch coordinates based on a change in capacitance between the driving touch electrode and the sensing touch electrode (mutual-capacitance) depending on presence or absence of a pointer, such as a finger or a pen.

In the self-capacitance-based touch sensing mode, each touch electrode TE has both the functions of the driving touch electrode and the sensing touch electrode. That is, the touch sensing circuit TSC applies a touch driving signal to at least one touch electrode TE, detects a touch sensing signal through the touch electrode TE having the touch driving signal applied thereto, and checks a change in capacitance between a pointer, such as a finger or a pen, and the touch electrode TE based on the detected touch sensing signal, thereby sensing whether touch has been performed and/or touch coordinates. In the self-capacitance-based touch sensing mode, the driving touch electrode and the sensing touch electrode are not distinguished from each other.

As described above, the display apparatus according to the embodiment of the present disclosure may sense touch in the mutual-capacitance-based touch sensing mode, or may sense touch in the self-capacitance-based touch sensing mode. Hereinafter, an example in which the display apparatus performs mutual-capacitance-based touch sensing and has a touch sensor structure therefor will be described for convenience of description.

Figure 7:
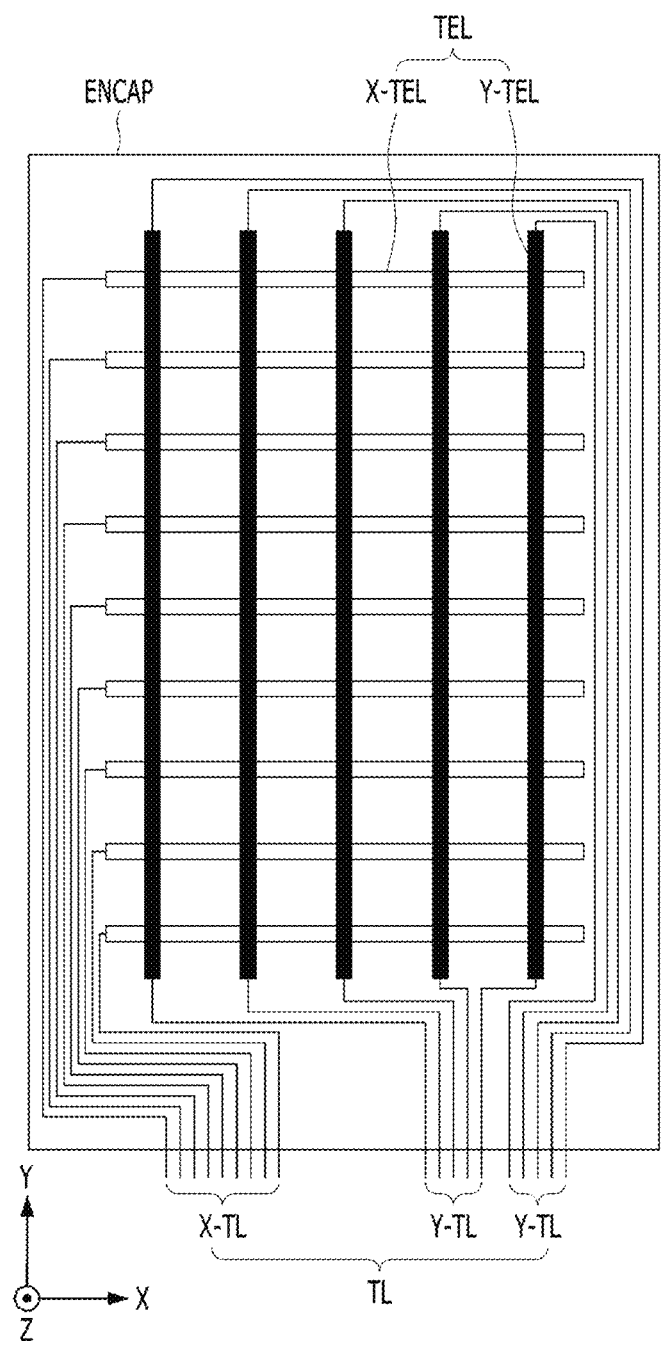
FIG. 7 illustrates a touch sensor structure in the display panel according to an embodiment of the present disclosure.
Figure 8:
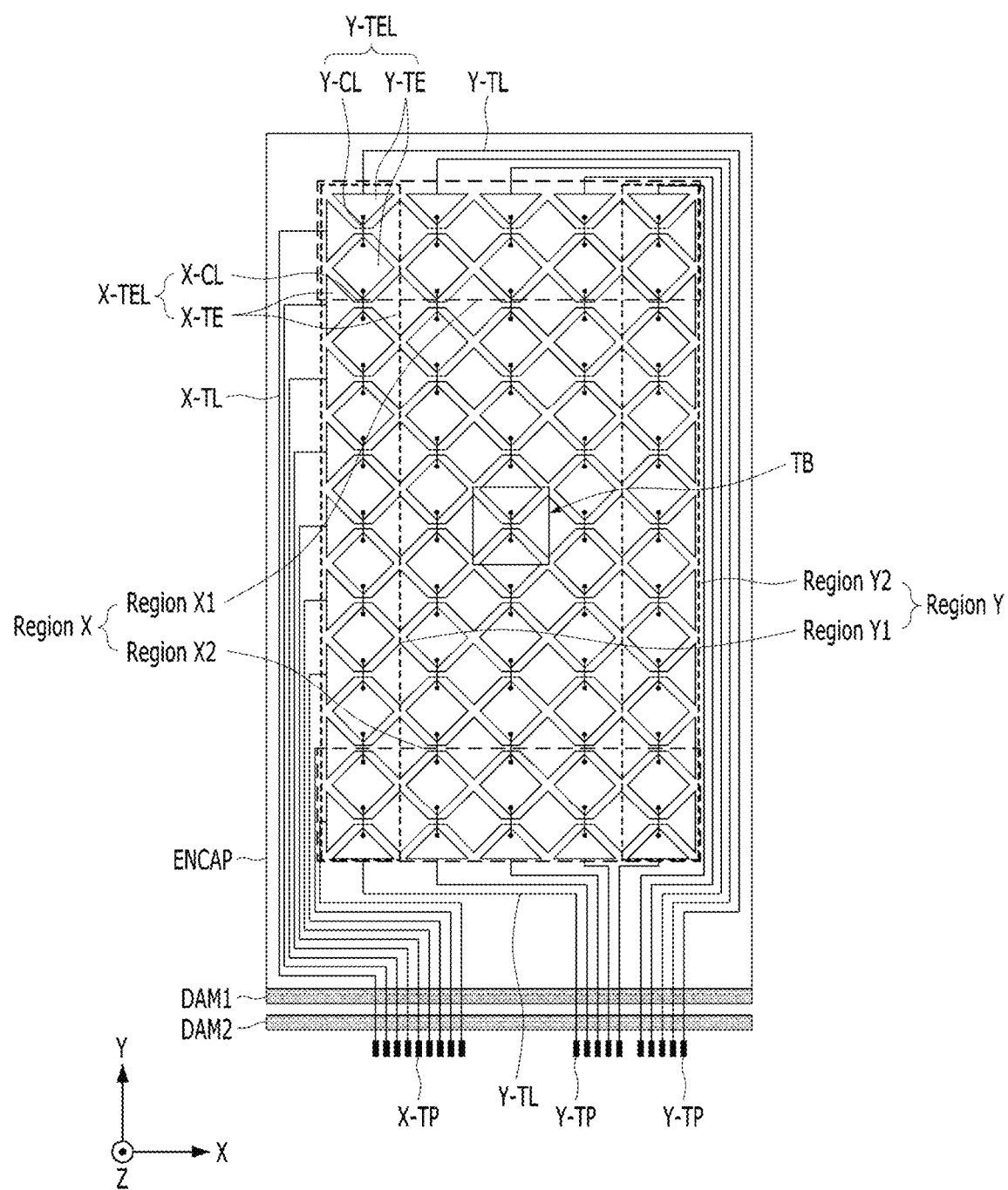
FIG. 8 illustrates the touch sensor structure of FIG. 7.

FIG. 7 illustrates a touch sensor structure in the display panel according to the embodiment of the present disclosure, and FIG. 8 illustrates the touch sensor structure of FIG. 7.

With reference to FIG. 7, the touch sensor structure for mutual-capacitance-based touch sensing may include a plurality of X-touch electrode lines X-TEL and a plurality of Y-touch electrode lines Y-TEL. For example, the plurality of X-touch electrode lines X-TEL and the plurality of Y-touch electrode lines Y-TEL may be located on the encapsulation portion ENCAP.

The plurality of X-touch electrode lines X-TEL may be disposed in a first direction, and the plurality of Y-touch electrode lines Y-TEL may be disposed in a second direction different from the first direction.

In this specification, the first direction and the second direction may be different directions. For example, the first direction may be an x-axis direction, and the second direction may be a y-axis direction. On the contrary, the first direction may be a y-axis direction, and the second direction may be an x-axis direction. In addition, the first direction and the second direction may be perpendicular to each other or may not be perpendicular to each other. Also, in this specification, rows and columns are relative, and the rows and the columns may be changed depending on the point of view.

Each of the plurality of X-touch electrode lines X-TEL may be constituted by several X-touch electrodes X-TE electrically connected to each other. Each of the plurality of Y-touch electrode lines Y-TEL may be constituted by several Y-touch electrodes Y-TE electrically connected to each other.

Here, the plurality of X-touch electrodes X-TE and the plurality of Y-touch electrodes Y-TE are included in the plurality of touch electrodes TE, and are electrodes having different roles (functions).

For example, the plurality of X-touch electrodes X-TE constituting each of the plurality of X-touch electrode lines X-TEL may be driving touch electrodes, and the plurality of Y-touch electrodes Y-TE constituting each of the plurality of Y-touch electrode lines Y-TEL may be sensing touch electrodes. For example, each of the plurality of X-touch electrode lines X-TEL may correspond to a driving touch electrode line, and each of the plurality of Y-touch electrode lines Y-TEL may correspond to a sensing touch electrode line.

On the contrary, the plurality of X-touch electrodes X-TE constituting each of the plurality of X-touch electrode lines X-TEL may be sensing touch electrodes, and the plurality of Y-touch electrodes Y-TE constituting each of the plurality of Y-touch electrode lines Y-TEL may be driving touch electrodes. For example, each of the plurality of X-touch electrode lines X-TEL may correspond to a sensing touch electrode line, and each of the plurality of Y-touch electrode lines Y-TEL may correspond to a driving touch electrode line.

A touch sensor metal for touch sensing may include a plurality of touch routing lines TL, in addition to the plurality of X-touch electrode lines X-TEL and the plurality of Y-touch electrode lines Y-TEL.

The plurality of touch routing lines TL may include one or more X-touch routing lines X-TL connected to each of the plurality of X-touch electrode lines X-TEL and one or more Y-touch routing lines Y-TL connected to each of the plurality of Y-touch electrode lines Y-TEL.

With reference to FIG. 8, each of the plurality of X-touch electrode lines X-TEL may include a plurality of X-touch electrodes X-TE disposed in the same row (or the same column) and one or more X-touch electrode connection lines X-CL configured to electrically connect the plurality of X-touch electrodes to each other. Here, an X-touch electrode connection line X-CL configured to connect two adjacent X-touch electrodes X-TE to each other may be a metal integrated with the two adjacent X-touch electrodes X-TE (the example of FIG. 8), or may be a metal connected to the two adjacent X-touch electrodes X-TE via a contact hole.

Each of the plurality of Y-touch electrode lines Y-TEL may include a plurality of Y-touch electrodes Y-TE disposed in the same column (or the same row) and one or more Y-touch electrode connection lines Y-CL configured to electrically connect the plurality of Y-touch electrodes to each other. Here, a Y-touch electrode connection line Y-CL configured to connect two adjacent Y-touch electrodes Y-TE to each other may be a metal integrated with the two adjacent Y-touch electrodes Y-TE, or may be a metal connected to the two adjacent Y-touch electrodes Y-TE via a contact hole (the example of FIG. 8).

In a region in which the X-touch electrode line X-TEL and the Y-touch electrode line Y-TEL intersect each other (touch electrode line intersection region), the X-touch electrode connection line X-CL and the Y-touch electrode connection line Y-CL may intersect each other.

When the X-touch electrode connection line X-CL and the Y-touch electrode connection line Y-CL intersect each other in the touch electrode line intersection region, therefore, the X-touch electrode connection line X-CL and the Y-touch electrode connection line Y-CL must be located in different layers.

In order to dispose the plurality of X-touch electrode lines X-TEL and the plurality of Y-touch electrode lines Y-TEL so as to intersect each other, therefore, the plurality of X-touch electrodes X-TE, the plurality of X-touch electrode connection lines X-CL, the plurality of Y-touch electrodes Y-TE, the plurality of Y-touch electrode lines Y-TEL, and the plurality of Y-touch electrode connection lines Y-CL may be located in two or more layers.

With reference to FIG. 8, each of the plurality of X-touch electrode lines X-TEL is electrically connected to a corresponding X-touch pad X-TP through one or more X-touch routing lines X-TL. For example, an outermost X-touch electrode X-TE, among a plurality of X-touch electrodes X-TE included in one X-touch electrode line X-TEL, may be electrically connected to a corresponding X-touch pad X-TP through the X-touch routing line X-TL.

Each of the plurality of Y-touch electrode lines Y-TEL is electrically connected to a corresponding Y-touch pad Y-TP through one or more Y-touch routing lines Y-TL. For example, an outermost Y-touch electrode Y-TE, among a plurality of Y-touch electrodes Y-TE included in one Y-touch electrode line Y-TEL, may be electrically connected to a corresponding Y-touch pad Y-TP through the Y-touch routing line Y-TL.

Meanwhile, as shown in FIG. 8, the plurality of X-touch electrode lines X-TEL and the plurality of Y-touch electrode lines Y-TEL may be disposed on the encapsulation portion ENCAP. For example, the plurality of X-touch electrodes X-TE and the plurality of X-touch electrode connection lines X-CL constituting the plurality of X-touch electrode lines X-TEL may be disposed on the encapsulation portion ENCAP. The plurality of Y-touch electrodes Y-TE and the plurality of Y-touch electrode connection lines Y-CL constituting the plurality of Y-touch electrode lines Y-TEL may be disposed on the encapsulation portion ENCAP.

Meanwhile, as shown in FIG. 8, each of the plurality of X-touch routing lines X-TL electrically connected to the plurality of X-touch electrode lines X-TEL may extend to a place in which the encapsulation portion ENCAP is absent so as to be electrically connected to a plurality of X-touch pads X-TP while being disposed on the encapsulation portion ENCAP. Each of the plurality of Y-touch routing lines Y-TL electrically connected to the plurality of Y-touch electrode lines Y-TEL may extend to a place in which the encapsulation portion ENCAP is absent so as to be electrically connected to a plurality of Y-touch pads Y-TP while being disposed on the encapsulation portion ENCAP. Here, the encapsulation portion ENCAP may be located in the active area AA, and may extend to the non-active area NA depending on circumstances.

Meanwhile, in order to prevent collapse of a certain layer (e.g., the encapsulation portion in the organic light-emitting display panel) in the active area AA, as described above, the dam area DA may be located at the border between the active area AA and the non-active area NA or in the non-active area NA, which is outside the active area AA.

As shown in FIG. 8, for example, a first dam DAM1 and a second dam DAM2 may be disposed in the dam area DA. Here, the second dam DAM2 may be located outside the first dam DAM1.

Unlike FIG. 8, only the first dam DAM1 may be located in the dam area DA in some embodiments, or one or more additional dam may be disposed in the dam area DA in addition to the first dam DAM1 and the second dam DAM2 in other embodiments, depending on circumstances.

With reference to FIG. 8, the encapsulation portion ENCAP may be located beside the first dam DAM1, or the encapsulation portion ENCAP may also be located above the first dam DAM1.

In order to solve a visibility problem in that the contour of the electrode metal EM appears on the screen and to equalize the magnitudes of capacitance for each touch electrode TE, the shapes (or contour shapes) of the touch electrodes TE may be unified. For example, as described above, the shape (or contour shape) of each of the individual touch electrodes X-TE and Y-TE may be a quadrangle, such as a diamond or a lozenge, or may be any of various shapes, such as a triangle, a pentagon, or a hexagon. As to the shape of the touch electrodes TE, the individual X-touch electrodes X-TE (or first touch electrodes) may have a single shape, the individual Y-touch electrodes Y-TE (or second touch electrodes) may have a single shape, and the X-touch electrodes X-TE and the Y-touch electrodes Y-TE may all have a single shape. Consequently, disposition of the individual touch electrodes X-TE and Y-TE has repeatability and regularity.

As an extension in concept of repeatability and regularity, function-specific division of the individual touch electrodes X-TE and Y-TE is called a touch block.

Figure 9:
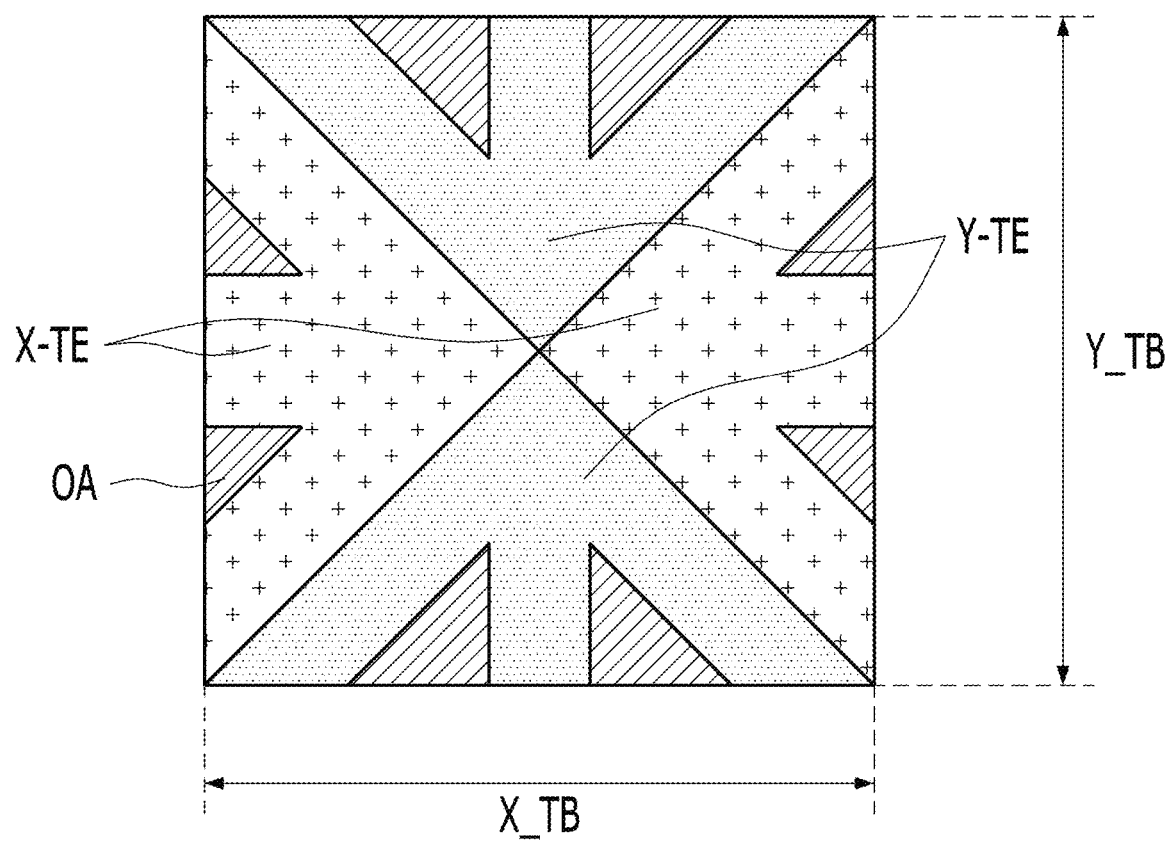
FIG. 9 illustrates a touch block according to an embodiment of the present disclosure.

FIG. 9 illustrates a touch block according to an embodiment of the present disclosure.

FIG. 9 is a schematic view of a touch block TB including an X-touch electrode X-TE, a Y-touch electrode Y-TE, and an opening OA. The distance between the X-touch electrode X-TE and the Y-touch electrode Y-TE, an X-touch electrode connection line X-CL, and a Y-touch electrode connection line Y-CL are omitted.

The touch block TB may be a region surrounded by imaginary lines that divide a plurality of X-touch electrodes X-TE (or first touch electrodes) into halves in the second direction (y-axis direction) and imaginary lines that divide a plurality of Y-touch electrodes Y-TE (or second touch electrodes) into halves in the first direction (x-axis direction).

Since the touch block TB is surrounded by the lines that divide the touch electrodes X-TE and Y-TE into halves, the size of the touch block TB may be changed depending on the shape and size of each of the touch electrodes X-TE and Y-TE. The width (or horizontal length) X_TB of the touch block TB may be width of the Y-touch electrode Y-TE in the first direction, and the height (or vertical length) Y_TB of the touch block TB may be width (or height) of the X-touch electrode X-TE in the second direction.

Touch blocks (or Unit Touch Block) UTB may have the same size and shape based on repeatability and regularity, and may be designed on the substrate SUB thereunder according to the size and shape of each of the plurality of subpixels SP.

Since the touch block TB has X-touch electrodes X-TE and Y-touch electrodes Y-TE, a touch sensing function may be performed based on capacitance formed between the touch electrodes TE. This may be referred to as a unit touch block UTB.

Consequently, a design mode in which a plurality of unit touch blocks UTB having the same shape is disposed in the active area AA is easier than a design mode in which individual touch electrodes X-TE and Y-TE are disposed.

With reference to FIG. 8, an area non-uniform region (or second region) in which the disposition area of the same-shaped touch blocks TB and the area of the active area AA are not identical to each other occurs in a contour part of the active area AA. The area non-uniform region may be divided into a non-uniform region (or 2-1 region) X partitioned in the first direction and a non-uniform region (or 2-2 region) Y partitioned in the second direction. The former may be divided into an upper non-uniform region X1 and a lower non-uniform region X2, and the latter may be divided into a left non-uniform region Y1 and a right non-uniform region Y2. Some non-uniform regions may be omitted depending on disposition of the same-shaped touch blocks TB in the active area AA.

When the area non-uniform region occurs, a method of adjusting the disposition area of the same-shaped touch blocks TB may be used, since the area of the active area AA is reference area. Hereinafter, a method of adjusting the disposition area of the same-shaped touch blocks TB in the upper non-uniform region X1 will be described.

Since the disposition area is determined by the width and height of the touch block TB and the width of the touch block TB is fixed in the upper non-uniform region X1, a method of adjusting the height of the touch block TB may be used.

Figure 10:
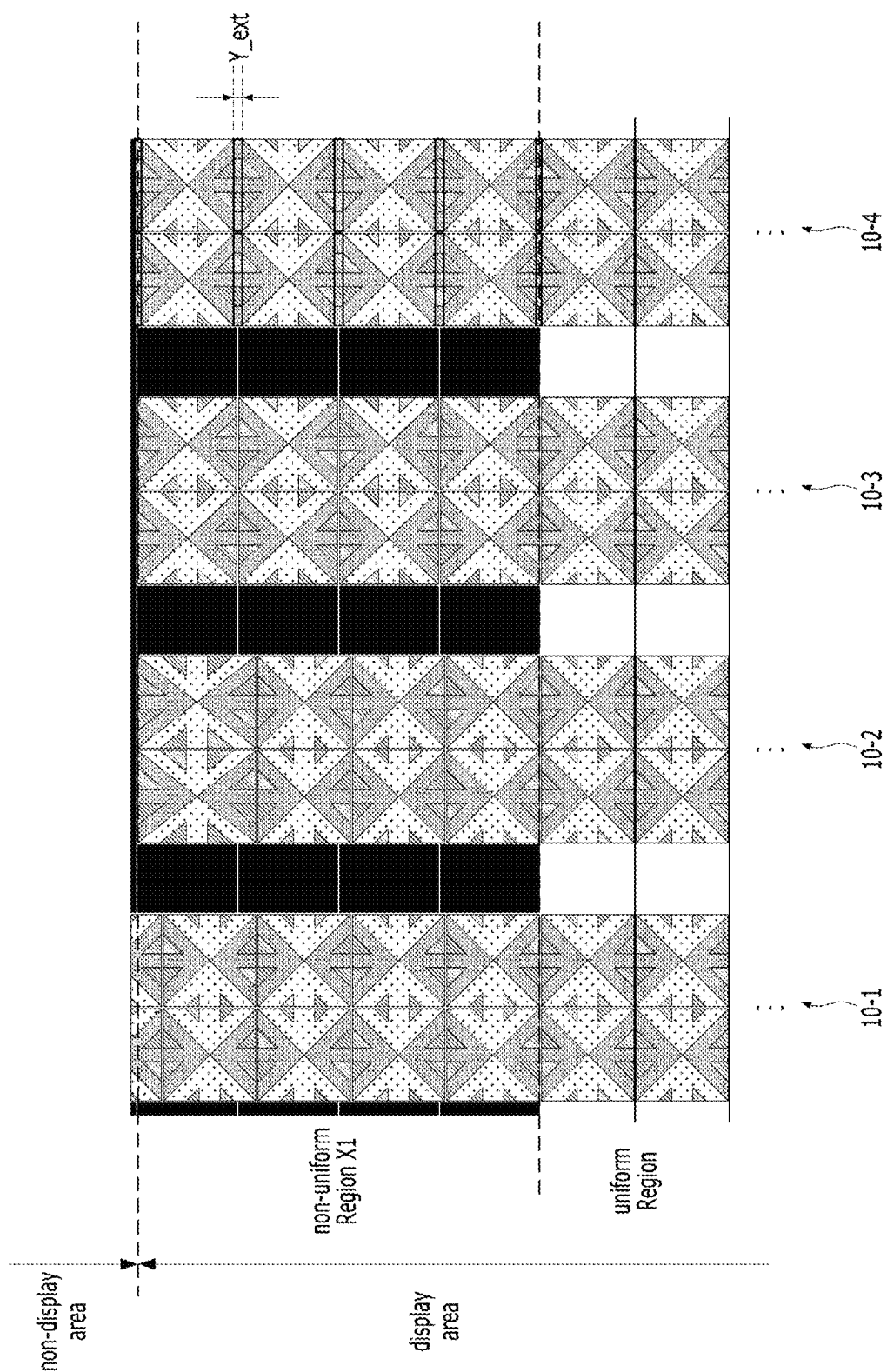
FIG. 10 illustrates the disposition of touch blocks in an active area according to an embodiment of the present disclosure.

FIG. 10 illustrates the disposition of touch blocks in the active area according to an embodiment of the present disclosure.

With reference to FIGS. 9 and 10, a method (10-1 or 10-4) of adjusting the same-shaped unit touch blocks UTB while maintaining the shape thereof or a method (10-2 or 10-3) of changing the shape of the touch blocks TB to adjust (set) the touch blocks TB may be used as a method of disposing touch blocks TB in the upper non-uniform region X1.

The method of changing the shape of the touch blocks TB to adjust (set) the touch blocks TB may be a method of disposing maximally receivable same-shaped unit touch blocks UTB in the upper non-uniform region X1 and extending the height of the outermost touch blocks TB to the contour of the upper non-uniform region X1 (hereinafter referred to as a "10-2 method") or a method of equally extending the height of the maximally receivable same-shaped unit touch blocks UTB in the upper non-uniform region X1 (hereinafter referred to as a "10-3 method").

As a result, the upper non-uniform region X1 may be completely filled with the touch blocks TB. Since the height of the touch blocks TB according to the 10-2 method or the 10-3 method in the upper non-uniform region X1 is different from the height Y_TB of the unit touch blocks UTB in the active areas AA, however, it may be difficult to secure equivalent touch sensing performance, compared to the unit touch blocks UTB.

For example, when the height (or the length in the second direction) of the upper non-uniform region X1 is 308 DP (display pixel) and the height Y_TB of the same-shaped unit touch blocks UTB is 72 DP, the height of the outermost touch blocks is 92 DP according to the 10-2 method, and therefore each of the outermost touch blocks has an area equivalent to 128% of the area of each unit touch block UTB. According to the 10-3 method, the height of each touch block TB is 77 DP, and therefore each touch block TB has an area equivalent to 107% of the area of each unit touch block UTB. Since the sensing performance of the touch electrode TE depends on capacitance and the capacitance is directly proportional to the area of the touch electrode TE, the touch performance according to the 10-2 method or the 10-3 method may not be uniform due to the increased area.

The method of adjusting (or setting) the same-shaped unit touch blocks UTB while maintaining the shape thereof may be a method of disposing (or forming) the same-shaped unit touch blocks UTB so as to exceed the upper non-uniform region (or to protrude from the upper non-uniform region) and cutting the excess portion (hereinafter referred to as a "10-1 method") or a method of forming an extension portion Y_ext of the Y-touch electrode Y-TE between the same-shaped unit touch blocks UTB to fill the upper non-uniform region X1 (hereinafter referred to as a "10-4 method").

According to the 10-1 method, the outermost touch blocks TB are cut, whereby the outermost touch blocks do not have the same shape as the unit touch blocks, and therefore it may be difficult to secure equivalent touch sensing performance, compared to the unit touch blocks UTB. According to the 10-4 method, the extension portion Y_ext is formed between the same-shaped unit touch blocks UTB while the unit touch blocks UTB are maintained, and therefore it is possible to secure equivalent touch sensing performance.

For example, when the height (or the length in the second direction) of the upper non-uniform region X1 is 308 DP (display pixel) and the height Y_TB of the same-shaped unit touch blocks UTB is 72 DP, the height of the outermost touch blocks TB is 20 DP according to the 10-1 method, and therefore each of the outermost touch blocks has an area equivalent to 28% of the area of each unit touch block UTB. According to the 10-4 method, the height of each unit touch block UTB is not changed, and the height of the extension portion Y_ext is 4 DP, and therefore each touch block TB has an area equivalent to 106% of the area of each unit touch block UTB. Consequently, it is possible to secure uniform touch sensing performance. However, the present disclosure is not limited as to the height.

Figure 11:
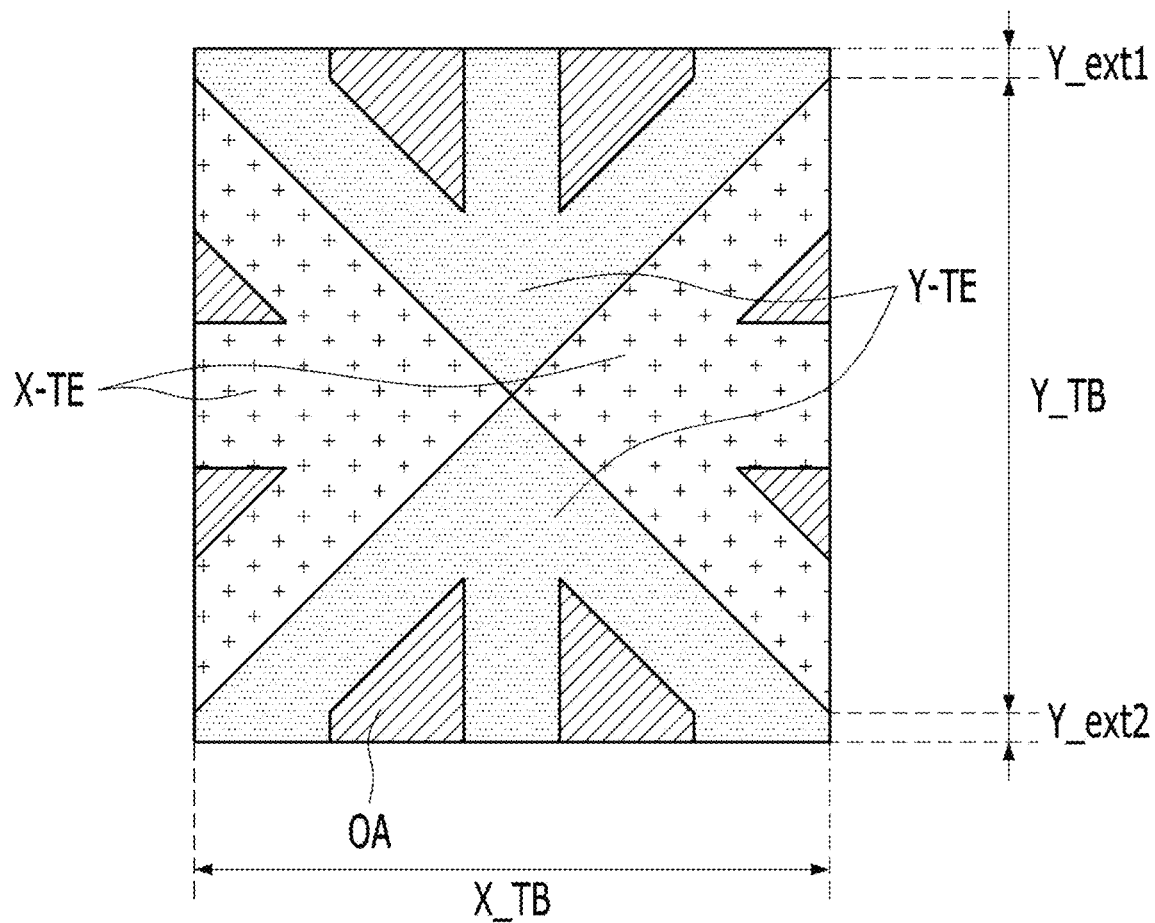
FIGS. 11 and 12 illustrate an extension portion added to the touch block according to the embodiment of the present disclosure.
Figure 12:
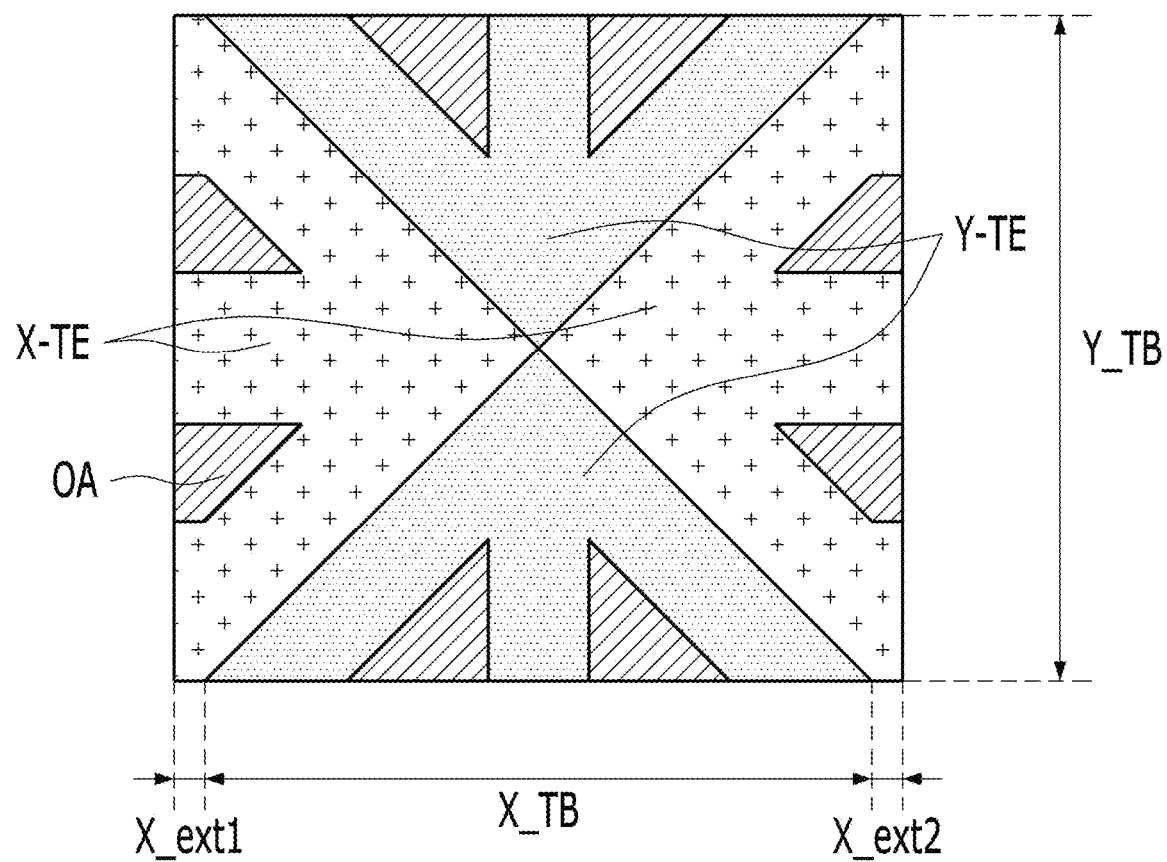
Figure 13:
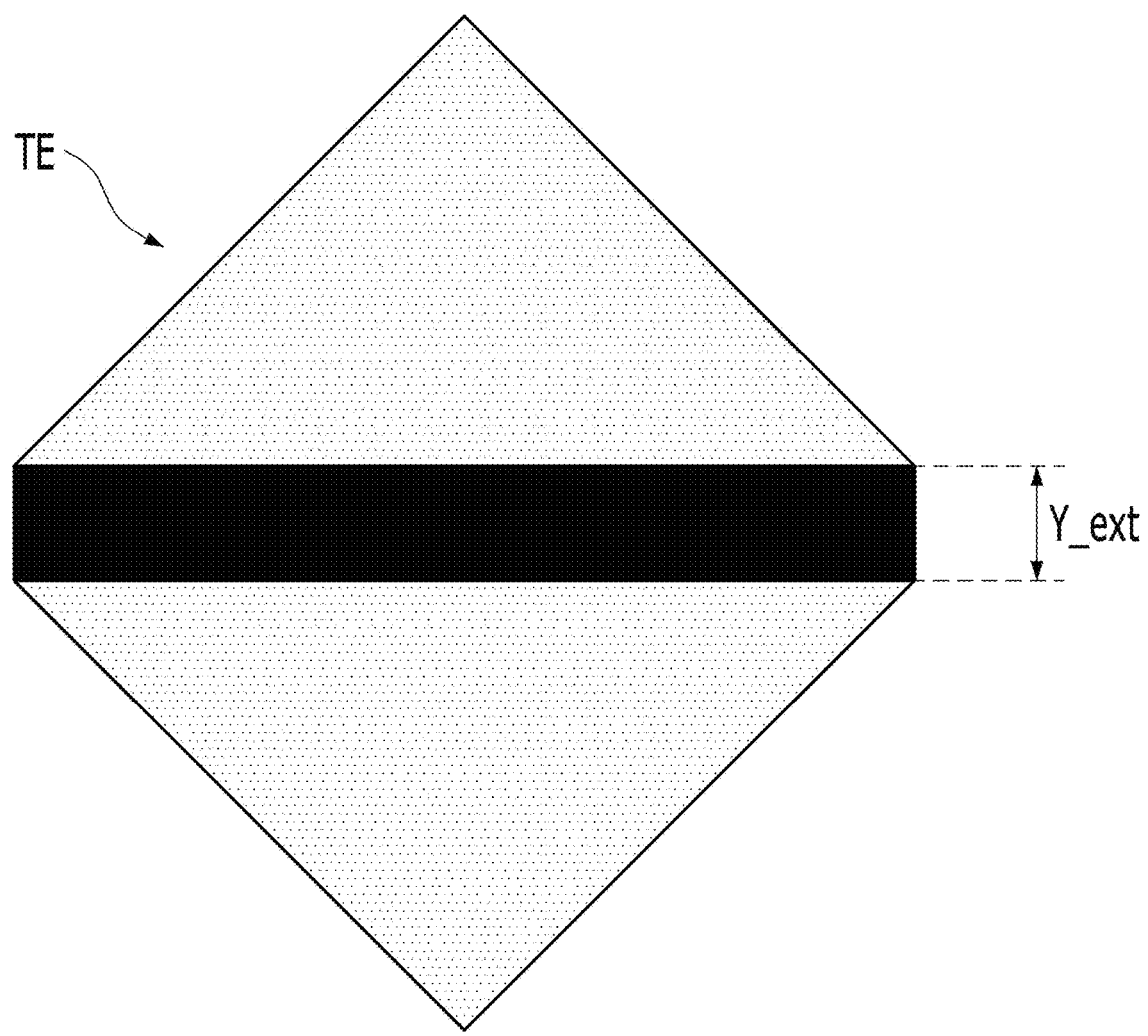
FIG. 13 illustrates an extension portion added to the touch electrode according to the embodiment of the present disclosure.

FIGS. 11 and 12 illustrate an extension portion added to the touch block according to the embodiment of the present disclosure, and FIG. 13 is a view showing an extension portion added to the touch electrode according to the embodiment of the present disclosure.

With reference to FIG. 11, an extension portion Y_ext (or fourth touch electrode) of the Y-touch electrode Y-TE may be formed between the same-shaped unit touch blocks UTB. As a result, it is possible to secure uniform touch sensing performance in the upper non-uniform region X1, and therefore it is possible to secure uniform touch sensing performance in the touch area. For example, the distance between the same-shaped unit touch blocks UTB in the upper non-uniform region X1 may be equal to the length of the extension portion Y_ext of the Y-touch electrode Y-TE.

The extension portion Y_ext may be formed at the upper side (or upper portion) of the unit touch block UTB, the lower side (or lower portion) of the unit touch block UTB, or the upper and lower sides of the unit touch block UTB. The extension portion Y_ext may be disposed at the upper side of the touch block TB (Y_ext1), or may be disposed at the lower side of the touch block TB (Y_ext2). In addition, the extension portion Y_ext may be disposed at the upper and lower sides of the touch block TB. The extension portion Y_ext has the following relationship: Y_ext=Y_ext1+Y_ext2. For example, the sizes of the extension portion disposed at the upper and lower sides of the touch block may be equal to each other. Referring to FIG. 13, the extension portion Y_ext may be described as being added to the Y-touch electrodes Y-TE.

In addition, the number of extension portions Y_ext of the unit touch blocks UTB in the upper non-uniform region X1 may be greater than the number of unit touch blocks UTB in the same region. For example, a maximally receivable number of unit touch blocks UTB are disposed in the upper non-uniform region X1 at equal intervals, an extension portion Y_ext is formed between the unit touch blocks UTB, and the unit touch block UTB and the extension portion Y_ext constitute a new touch block TB, which is repeatedly disposed. As a result, the number of extension portions Y_ext formed in the upper non-uniform region X1 may be greater than the number of unit touch blocks UTB in the same region. For example, when the number of unit touch blocks UTB maximally receivable in the upper non-uniform region X1 is 4, the number of extension portions Y_ext may be 4 or 5 or more.

According to the embodiment of the present disclosure, an extension portion Y_ext of the Y-touch electrode Y-TE may also be formed between the same-shaped unit touch blocks UTB in the lower non-uniform region X2, whereby it is possible to secure uniform touch sensing performance. The number of extension portions Y_ext of the Y-touch electrodes Y-TE in the lower non-uniform region X2 may be greater than the number of unit touch blocks UTB in the same region.

With reference to FIG. 12, an extension portion X_ext1 (or third touch electrode) of the X-touch electrode X-TE may be formed between the same-shaped unit touch blocks UTB in the left non-uniform region Y1, and an extension portion X_ext2 of the X-touch electrode X-TE may be formed between the same-shaped unit touch blocks UTB in the right non-uniform region Y2, whereby it is possible to secure uniform touch sensing performance. The number of extension portions X_ext of the X-touch electrodes X-TE in the left non-uniform region Y1 and/or the right non-uniform region Y2 may be greater than the number of unit touch blocks UTB in the same region.

According to the embodiment of the present disclosure, the extension portion X_ext of the X-touch electrode X-TE may be formed between the same-shaped unit touch blocks UTB, whereby it is possible to secure uniform touch sensing performance in the right non-uniform region Y2, and therefore it is possible to secure uniform touch sensing performance in the touch area. For example, the distance between the same-shaped unit touch blocks UTB in the right non-uniform region Y2 may be equal to the length of the extension portion X_ext of the X-touch electrode X-TE.

The extension portion X_ext may be formed at the left side (or left portion) of the unit touch block UTB, the right side (or right portion) of the unit touch block UTB, or the left and right sides of the unit touch block UTB. The extension portion X_ext may be disposed at the left side of the touch block TB (X_ext1), or may be disposed at the right side of the touch block TB (X_ext2). In addition, the extension portion X_ext may be disposed at the left and right sides of the touch block TB. The extension portion X_ext has the following relationship: X_ext=X_ext1+X_ext2. For example, the sizes of the extension portion disposed at the left and right sides of the touch block may be equal to each other.

In addition, the number of extension portions X_ext of the unit touch blocks UTB in the right non-uniform region Y2 may be greater than the number of unit touch blocks UTB in the same region. For example, a maximally receivable number of unit touch blocks UTB are disposed in the right non-uniform region Y2 at equal intervals, an extension portion X_ext is formed between the unit touch blocks UTB, and the unit touch block UTB and the extension portion X_ext constitute a new touch block TB, which is repeatedly disposed. As a result, the number of extension portions X_ext formed in the right non-uniform region Y2 may be greater than the number of unit touch blocks UTB in the same region. For example, when the number of unit touch blocks UTB maximally receivable in the right non-uniform region Y2 is 3, the number of extension portions X_ext may be 3 or 4 or more.

According to the embodiment of the present disclosure, an extension portion X_ext of the X-touch electrode X-TE may also be formed between the same-shaped unit touch blocks UTB in the left non-uniform region Y1, whereby it is possible to secure uniform touch sensing performance. The number of extension portions X_ext of the X-touch electrodes X-TE in the left non-uniform region Y1 may be greater than the number of unit touch blocks UTB in the same region.

According to the embodiment of the present disclosure, in the contour part of the active area AA, for example, the area non-uniform region in which the area of the active area AA and the disposition area of the same-shaped unit touch blocks UTB are not identical to each other, extension portions may be formed and then the touch blocks UTB may be disposed, whereby it is possible to secure uniform touch sensing performance.

According to the embodiment of the present disclosure, the same-shaped unit touch blocks UTB may be disposed at the contour part of the active area AA, whereby it is possible to secure the degree of freedom in touch electrode design, to easily inspect repeatability of touch blocks, and to design standardized touch electrodes.

A display apparatus according to an embodiment of the present disclosure may be configured as follows.

A display apparatus according to an embodiment of the present disclosure comprises a plurality of emissive devices disposed in a display area, a plurality of signal lines disposed in a non-display area located outside the display area, a plurality of first touch electrodes disposed in the display area, the plurality of first touch electrodes being arranged in a first direction, and a plurality of second touch electrodes disposed in the display area, the plurality of second touch electrodes being arranged in a second direction perpendicular to the first direction, a plurality of touch routing lines disposed in the non-display area, the plurality of touch routing lines being electrically connected to the first touch electrodes or the second touch electrodes, wherein the display area includes a first region including unit touch blocks surrounded by lines that divide the plurality of first touch electrodes into halves in the second direction and lines that divide the plurality of second touch electrodes into halves in the first direction and a second region provided so as to surround the first region, the unit touch blocks being disposed spaced apart from each other in the second region.

According to some embodiments of the present disclosure, the second region may include a 2-1 region in which the unit touch blocks are repeated in the first direction and a 2-2 region in which the unit touch blocks are repeated in the second direction.

According to some embodiments of the present disclosure, in the 2-1 region, the distance between the unit touch blocks in the second direction may be equal to the length of an extension portion of each of the second touch electrodes.

According to some embodiments of the present disclosure, in the 2-2 region, the distance between the unit touch blocks in the first direction may be equal to the length of an extension portion of each of the first touch electrodes.

According to some embodiments of the present disclosure, the 2-1 region may be located at an upper side or a lower side of the display area.

According to some embodiments of the present disclosure, the 2-2 region may be located at a left side or a right side of the display area.

According to some embodiments of the present disclosure, in the 2-1 region, the number of the second touch electrode extension portions may be greater than the number of the unit touch blocks in the second direction.

According to some embodiments of the present disclosure, in the 2-2 region, the number of the first touch electrode extension portions may be greater than the number of the unit touch blocks in the first direction.

The display apparatus according to some embodiments of the present disclosure may further include an encapsulation portion disposed on the plurality of emissive devices and the plurality of signal lines.

A display apparatus according to another embodiment of the present disclosure includes a plurality of emissive devices disposed in a display area, a plurality of signal lines disposed in a non-display area located outside the display area, an encapsulation portion disposed on the plurality of emissive devices and the plurality of signal lines, a plurality of first touch electrodes disposed on the encapsulation portion in the display area, the plurality of first touch electrodes being arranged in a first direction, and a plurality of second touch electrodes disposed on the encapsulation portion in the display area, the plurality of second touch electrodes being arranged in a second direction perpendicular to the first direction, one or more third touch electrodes including first extension portions having lines that divide the first touch electrodes into halves in the second direction extending in the first direction, one or more fourth touch electrodes including second extension portions having lines that divide the second touch electrodes into halves in the first direction extending in the second direction, and a plurality of touch routing lines disposed on the encapsulation portion in the non-display area, the plurality of touch routing lines being electrically connected to the first to fourth touch electrodes, wherein the display area includes a first region in which the plurality of first touch electrodes and the plurality of second touch electrodes are disposed and a second region provided so as to surround the first region, the one or more third touch electrodes or the one or more fourth touch electrodes being disposed in the second region.

According to some embodiments of the present disclosure, the second region may include a 2-1 region in which the one or more fourth touch electrodes are disposed in the second direction and a 2-2 region in which the one or more third touch electrodes are disposed in the first direction.

According to some embodiments of the present disclosure, the 2-1 region may be located at an upper side or a lower side of the display area.

According to some embodiments of the present disclosure, the 2-2 region may be located at a left side or a right side of the display area.

According to another aspect of the present disclosure, a touch panel includes a plurality of touch electrodes arranged in a first direction or a second direction, the touch electrodes arranged in one or more touch blocks, the touch panel comprising: a plurality of first touch blocks of a first shape; a plurality of second touch blocks of a second shape different from the first shape, the second touch blocks disposed in outermost regions of the touch panel.

In some embodiments, the second shape of the second touch blocks is longer in the first direction or the second direction than the first touch blocks. In some embodiments, the second shape of the second touch blocks include the first shape augmented by an extension portion.

In some embodiments, the second touch blocks are disposed in an outermost area of the touch panel in the first direction, and the extension portion is augmented to the first shape in the first direction. In some embodiments, the second touch blocks are disposed in an outermost area of the touch panel in the second direction, and the extension portion is augmented to the first shape in the second direction.

In some embodiments, the touch blocks are mesh-type including a plurality of touch metal elements arranged in a mesh shape, and the extension portion of the second touch blocks includes extended portions from the touch metal elements of the first shape. In some embodiments, a distance between two adjacent ones of the second touch blocks equals a length of the extension portion.

In some embodiments, the touch panel is disposed on an encapsulation portion of a display device. In some embodiments, the second touch blocks are disposed in a uppermost region, a lowermost region, a leftmost region, or a rightmost region of the touch panel. In some embodiments, the second touch blocks surround the first touch blocks in the touch panel.

In some embodiments, both the first shape of the first touch blocks and the second shape of the second touch blocks are symmetrical with respect to a center of each of the first touch blocks and the second touch blocks, respectively, in both the first direction and the second direction. In some embodiments, the second touch blocks are greater in size than the first touch blocks.

As is apparent from the above description, according to the embodiment of the present disclosure, the same-shaped unit touch blocks and the extensions portions of the touch electrodes may be disposed in the touch area located at the contour part of the display area of the display panel, whereby it is possible to secure touch sensing performance equivalent to the touch sensing performance of the same-shaped unit touch blocks in the touch area located at the non-contour part of the display area.

According to the embodiment of the present disclosure, the same-shaped touch blocks may be used, whereby it is possible to secure the degree of freedom in touch electrode design, to easily inspect repeatability of touch blocks, and to design standardized touch electrodes.

It will be apparent to those skilled in the art that various modifications and variations can be made in the present disclosure without departing from the technical idea or scope of the disclosures. Thus, it is intended that the present disclosure cover the modifications and variations of this disclosure provided they come within the scope of the appended claims and their equivalents.

What is claimed is:

1. A touch panel including touch blocks arranged in an X-direction and a Y-direction in a display area, the touch panel comprising:
 a plurality of first touch blocks at a center region of the display area, each of the plurality of first touch blocks having a first shape; and
 a plurality of second touch blocks in outermost regions of the display area, each of the plurality of second touch blocks having a second shape different from the first shape,
 wherein the plurality of second touch blocks are arranged in a same direction as the plurality of first touch blocks and further include an extension portion between two adjacent ones of the plurality of second touch blocks than the plurality of first touch blocks.

2. The touch panel according to claim 1, wherein the second shape of the plurality of second touch blocks in an upper outermost region and a lower outermost region of the display area is longer at least in the Y-direction than the first shape of the plurality of first touch blocks in the Y-direction.

3. The touch panel according to claim 2, wherein the second shape includes the first shape augmented by the extension portion in the Y-direction.

4. The touch panel according to claim 1, wherein the second shape of the plurality of second touch blocks in a leftmost region and a rightmost region the display area is longer at least in the X-direction than the first shape of the plurality of first touch blocks in the X-direction.

5. The touch panel according to claim 4, wherein the second shape includes the first shape augmented by the extension portion in the X-direction.

6. The touch panel according to claim 1, wherein each of the plurality of first touch blocks and the plurality of second touch blocks comprises mesh-type including a plurality of touch metal elements arranged in a mesh shape, and
 wherein the extension portion of the plurality of second touch blocks includes extended portions from the plurality of touch metal elements of the first shape.

7. The touch panel according to claim 3, wherein a distance between two adjacent ones of the plurality of second touch blocks equals a length of the extension portion.

8. The touch panel according to claim 1, wherein the touch panel is disposed on an encapsulation portion of a display device.

9. The touch panel according to claim 1, wherein the plurality of second touch blocks are disposed in an uppermost region, a lowermost region, a leftmost region, and a rightmost region of the display area, respectively.

10. The touch panel according to claim 1, wherein a region including the plurality of second touch blocks surround a region including the plurality of first touch blocks in the display area.

11. The touch panel according to claim 1, wherein the first shape of the plurality of first touch blocks is symmetrical with respect to a center of each of the plurality of first touch blocks in both the X-direction and the Y-direction, and
 wherein the second shape of the plurality of second touch blocks are symmetrical with respect to a center of each of the plurality of second touch blocks in both the X-direction and the Y-direction.

12. The touch panel according to claim 9, wherein each of the plurality of second touch blocks is greater in size than each of the plurality of first touch blocks.

13. The touch panel according to claim 9, wherein the plurality of first touch blocks and the plurality of second touch blocks are disposed on an encapsulation layer and wherein the encapsulation layer is disposed over a plurality of emissive devices.

14. The touch panel according to claim 13, wherein the encapsulation layer is overlapped with a part of a dam.

15. The touch panel according to claim 13, further comprising a plurality of touch pads at an outer region of the encapsulation layer.

16. The touch panel according to claim 1, further comprising a plurality of touch pads at an outer region of a dam.

17. The touch panel according to claim 16, further comprising a touch routing line disposed between one of the plurality of second touch blocks and one of the plurality of touch pads,
- wherein the touch routing line is connected to the one of the plurality of touch pads by overlapping the dam.

18. The touch panel according to claim 1, wherein the plurality of first touch blocks and the plurality of second touch blocks comprise a plurality of openings among touch metal lines and the plurality of openings are corresponding to emissive regions of a plurality of emission devices.

19. The touch panel according to claim 1, the plurality of first touch blocks and the plurality of second touch blocks are disposed on an encapsulation layer, wherein the encapsulation layer covers a plurality of emissive devices in the display area and a plurality of signal lines outside the display area.

\* \* \* \* \*